United States Patent
Tano (10) Patent No.: US 7,312,708 B2
(45) Date of Patent: Dec. 25, 2007

(54) RF TAG RECYCLING SYSTEM AND RF TAG COLLECTING APPARATUS

(75) Inventor: Atsushi Tano, Kariya (JP)

(73) Assignee: DENSO WAVE INCORPOARTED, Tokyo (JP)

( * ) Notice: Subject to any disclaimer, the term of this patent is extended or adjusted under 35 U.S.C. 154(b) by 394 days.

(21) Appl. No.: 11/137,568

(22) Filed: May 26, 2005

(65) Prior Publication Data

US 2005/0267806 A1     Dec. 1, 2005

(30) Foreign Application Priority Data

May 26, 2004   (JP)   .............................. 2004-156185

(51) Int. Cl.
  *G08B 13/14* (2006.01)
(52) U.S. Cl. ............................. 340/572.4; 340/572.1; 340/569; 340/5.66; 235/385; 235/449; 235/493
(58) Field of Classification Search ............ 340/572.4, 340/572.1, 568.1, 569, 539.13, 5.66; 235/383, 235/385, 449, 493; D14/385, 430; D18/4.5, D18/4.6
See application file for complete search history.

(56) References Cited

U.S. PATENT DOCUMENTS 6,664,520 B2 *  12/2003  Clothier ...................... 219/634
7,053,773 B2 *   5/2006  McGarry et al. ........ 340/568.1
7,183,919 B2 *   2/2007  Wang ....................... 340/572.1
7,199,714 B2 *   4/2007  Sako et al. ............... 340/572.1

FOREIGN PATENT DOCUMENTS

JP      2002-236889      8/2002
JP      2004-43143       2/2004

* cited by examiner

Primary Examiner—Davetta W. Goins
(74) Attorney, Agent, or Firm—Posz Law Group, PLC (57) ABSTRACT

The RF tag recycling system for recycling RF tags containing information on goods to which the RF tags are attached includes data storage mediums which are portable by consumers and issued by stores affiliated with the system, at least one RF tag collecting apparatus configured to calculate, when one of the data storage mediums is inserted into the RF collecting apparatus, a reward point value for RF tags put in the RF collecting apparatus, and to update the one of the data storage mediums on the basis of the calculated reward point value. The RF tag recycling system further includes a data processing apparatus configured to accumulate the calculated reward point value received from the RF tag collecting apparatus and to notify one of the stores which is an issuer of the one of the data storage mediums of information on an accumulated reward point value.

10 Claims, 8 Drawing Sheets

| ENTERPRISE No. | STORE NAME | REWARD POINT |
|---|---|---|
| 0001—xx | SUPERMARKET A | 40 |
| 0002—xx | ◯◯STORE | 65 |
| 0003—xx | DEPARTMENT STORE B | 157 |
| ... | ... | ... |

CHECK DIGITS

RF TAG RECYCLING SYSTEM AND RF TAG COLLECTING APPARATUS

CROSS-REFERENCE TO RELATED APPLICATION

This application is related to Japanese Patent Application No. 2004-156185 filed on May 26, 2004, the contents of which are hereby incorporated by reference.

BACKGROUND OF THE INVENTION

1. Field of the Invention

The present invention relates to an RF tag recycling system for reclaiming RF tags containing information on goods to which they have been attached from consumers and reusing them, and to an RF tag collecting apparatus for use in such a system.

2. Description of Related Art

There is growing need to increase safety of perishable goods such as meat, vegetables, and fruit. One of the ways for addressing the need is to administrate information on production districts, distribution channels and the like of goods, and disclose the information to consumers so that they themselves can judge whether the goods which they are considering buying are safe or not.

There is a goods administration system (goods traceability system) in operation established for providing consumers with such information. In this system, information storage media are attached to goods so that the consumers in stores can know when and where the goods which they have just picked up were produced and processed, and through which channels the goods have reached the stores.

In such a system, bar-code labels can be used as the information storage media. However, since the storage capacity of the bar-code labels is small, the bar-code labels contain only identification codes of the goods to which they are attached in most cases. Accordingly, all other information items such as the distribution channels of the goods have to be administrated on a server side. Therefore, to allow revising or adding information items, or reading information items from the server, an environment that enables access to the server through a network, for example, has to be provided.

Incidentally, as proposed in Japanese Patent Application Laid-open Nos. 2004-043143 and 2002-236889, it is known to use RF (Radio Frequency) tags which are easy to read and write instead of the bar-code labels. The RF tags can contain many information items such as distribution channels, because the storage capacity of the RF tags is large.

However, the RF tags are far more expensive than the bar-code labels, and accordingly operational costs of such a goods administration system becomes exceedingly high if all the goods handled in stores utilizing this system are attached with the RF tags. The increase of the operational costs inevitably raises goods prices. For such reason, the goods administration system using the RF tags is far from widespread so far.

SUMMARY OF THE INVENTION

The RF tag recycling system of the invention for recycling RF tags containing information on goods to which the RF tags are attached includes:

data storage mediums which are portable by consumers and issued by stores affiliated with the system;

at least one RF tag collecting apparatus configured to calculate, when one of the data storage mediums is inserted into the RF tag collecting apparatus, a reward point value for RF tags put into the RF tag collecting apparatus, and to update the one of the data storage mediums on the basis of the calculated reward point value; and a data processing apparatus configured to accumulate the calculated reward point value received from the RF tag collecting apparatus.

With the RF tag recycling system of the invention, it is possible to collect used RF tags efficiently by giving consumers with a price discount service depending on the reward point balance, for example, in return for the consumer's cooperation on collecting the RF tags. This lowers the costs of running the RF tag recycling system. Accordingly, the RF tag recycling system of the invention can be expected to be widespread.

The RF tag collecting apparatus of the invention for use in such an RF tag recycling system includes:

a receiver receiving RF tags put in the RF tag collecting apparatus;

a counter for counting the number of the RF tags received in the receiver;

a calculating unit calculating a reward point value for the RF tags received in the receiver on the basis of the number counted by the counter;

a reader/writer updating a data storage medium inserted into the RF tag collecting apparatus by reading a reward point balance from the inserted data storage medium, performing addition of the reward point balance and the calculated reward point value, and writing a result of the addition as a new reward point balance into the inserted data storage medium.

PREFERRED EMBODIMENTS OF THE INVENTION

Figure 1:
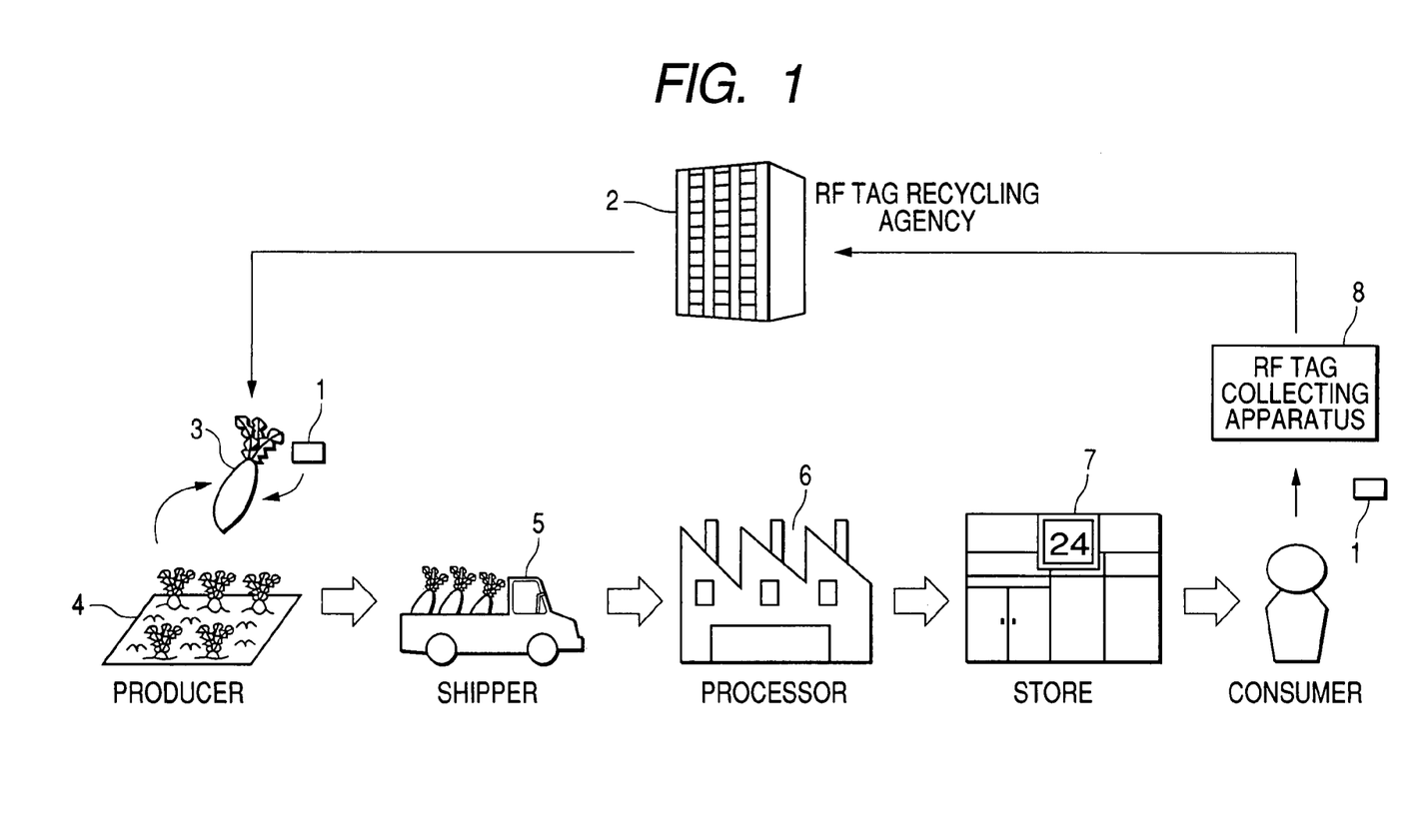
FIG. 1 is a view schematically showing an RF tag recycling system according to an embodiment of the invention.

FIG. 1 schematically shows an RF tag recycling system according to an embodiment of the invention. In this system, a producer 4 of a goods 3 purchases or rents an RF tag 1 of a shape of several mm square from an RF tag recycling agency 2 having an RF tag data processing apparatus. The producer 4 writes information items about the goods 3 such as the date and place when where the goods 3 was gathered or produced, the kind of the goods 3, and the name of the producer 4 into the RF tag 1 by use of a tag reader/writer (not shown) or the like. The goods 3 is attached with the RF tag 1, and is handed over to a shipper 5.

The shipper 5 adds the name of the shipper 5, a traveling route, a traveling date and time, etc. to the RF tag 1 attached to the goods 3 before handing it over to a processor 6. The processor 6 processes the goods 3, and adds the name of the processor 6, a processing data and time, names of materials used for processing the goods 3, an expiration date of the goods, etc. to the RF tag 1. The processed goods 3 is shipped to a store 7 (through a shipper when necessary). The store 7 adds the price of the goods 3 etc to the RF tag 1, and places the goods 3 on sale. The store 7 has a tag reader (not shown) installed therein, so that consumers can know when and where the goods 3 was produced (or gathered), and processed, for example, by reading the RF tag 1 by use of the tag reader.

The store 7 itself can use the tag reader to read the price of the goods 3 from the RF tag 1 at a cash register in the store 7. If each goods in the store 7 is attached with a bar-code label instead of the RF tag, to read prices of a plurality of goods in a shopping basket at the cash register, their bar-codes have to be scanned by use of a bar-code reader one by one. In this embodiment where each goods is attached with the RF tag, prices of a plurality of goods in a shopping basket can be read at a time by transmitting radio signals containing their prices from the RF tags to the cash register. This speeds the checkout process at the cash register.

Figure 2:
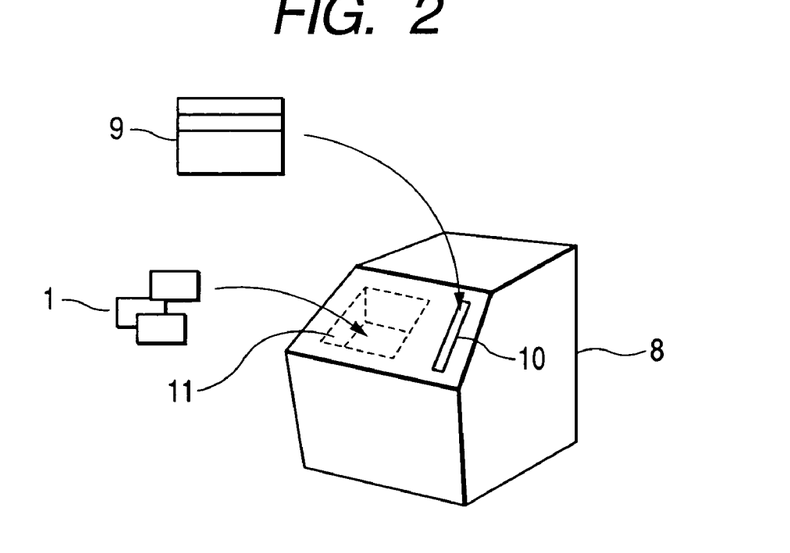
FIG. 2 is an external view of a RF tag collecting apparatus used in the RF tag recycling system.

In this embodiment, an RF tag collecting apparatus 8 as shown in FIG. 2 is installed at each tag collecting spot. The tag collecting spots may be located in the stores utilizing this system. The store 7 issues membership cards 9 (magnetic card, IC cards or the like) to consumers using the store 7. The membership card 9 contains an identification code for identifying the store 7 (enterprise number of the store 7, for example). The membership card 9 may contain a code for identifying a consumer possessing this card 9 as necessary. The membership card 9 can be written by the RF tag collecting apparatus 8.

Figure 3:
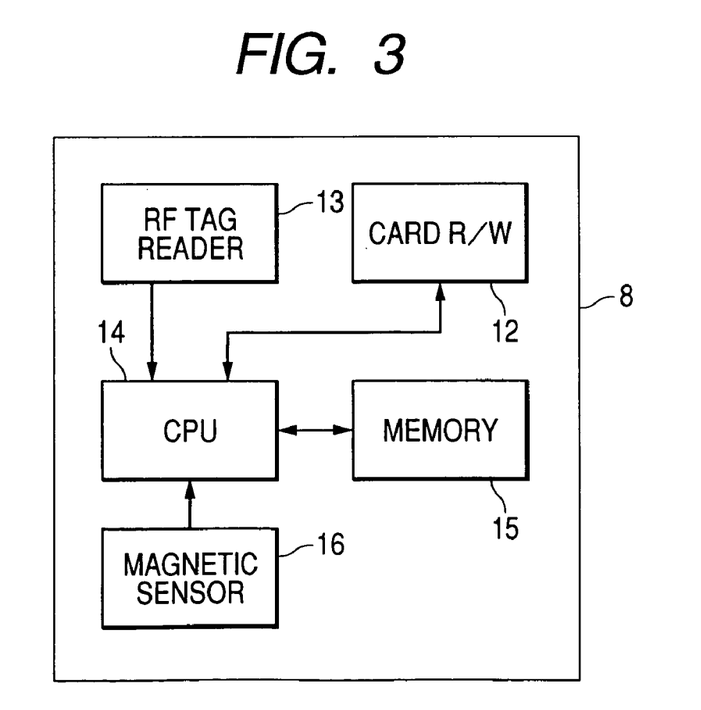
FIG. 3 is a block diagram showing an electrical structure of the RF tag collecting apparatus.

The RF tag collecting apparatus 8 has a card slot 10 into which the card 9 is inserted, and a receiver 11 for receiving the RF tags 1 put therein. FIG. 3 is a block diagram showing an electrical structure of the tag collecting apparatus 8. As shown in this figure, the tag collecting apparatus 8 includes a card reader/writer 12 for reading and writing the card 9, a tag reader 13 for reading information items from the RF tags 1 in the receiver 11, a CPU 14 performing control of the card reader/writer 12 and the tag reader 13 and also performing overall control of the tag collecting apparatus 8, and a memory 15 used by the CPU 14.

The tag collecting apparatus 8 further includes a magnetic sensor 16 which outputs a detection signal to the CPU 14 each time the RF tag 1 passes over the magnetic sensor 16.

Figure 4:
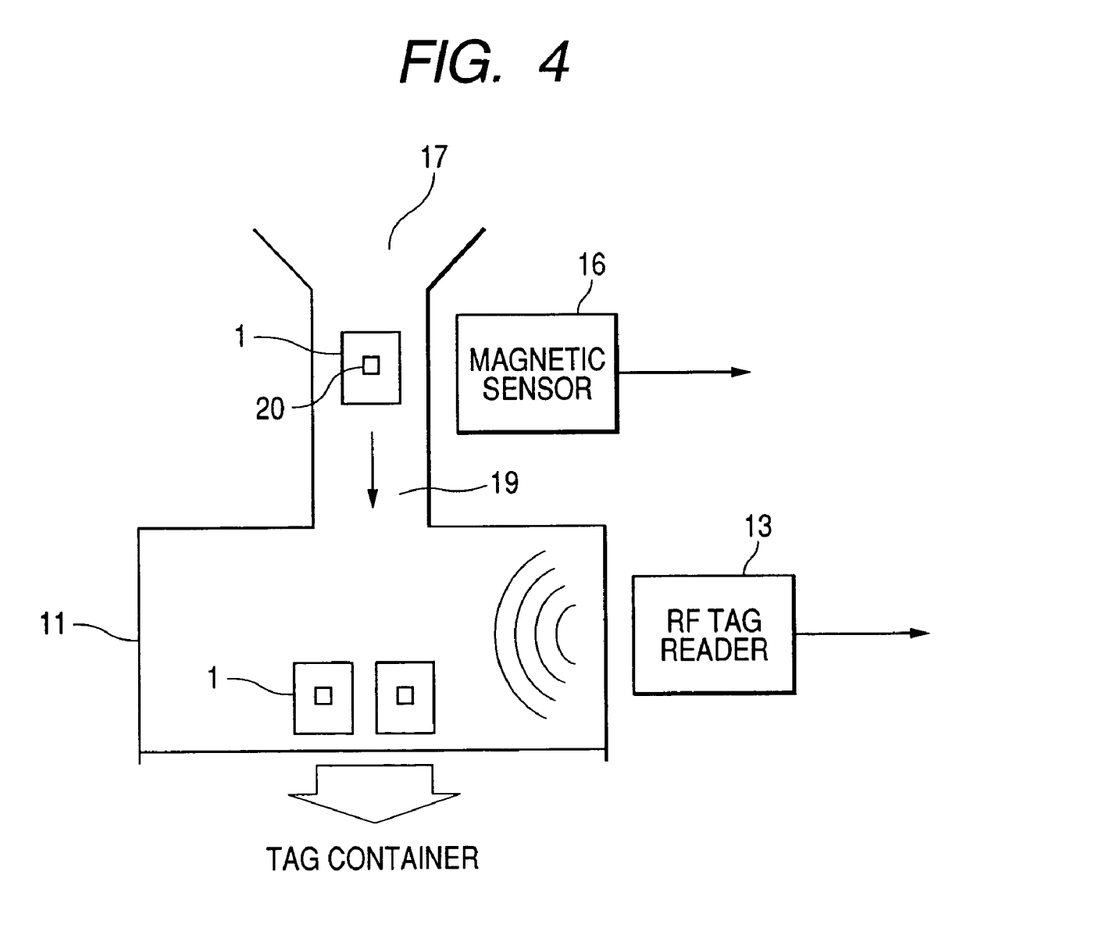
FIG. 4 is a view schematically showing a structure of a tag counting part of the RF tag collecting apparatus.

As shown in FIG. 4, the RF tag collecting apparatus 8 has a mouth 17 through which the RF tags 1 are put in one by one. The RF tags put in through the mouth 17 reach the receiver 11 through a passageway.

The RF tag 1 has a magnetic marker 20 made of magnetic coating material formed at its surface. The magnetic sensor 16, which is located in the midway of the passageway 19, detects magnetism from the magnetic marker 20 of the RF tag 1 passing the passageway 19, and outputs a detection signal to the CPU 14. The CPU 14 can count the number of the RF tags 1 received in the receiver 11 on the basis of the detection signal sent from the magnetic sensor 16.

Figure 5:
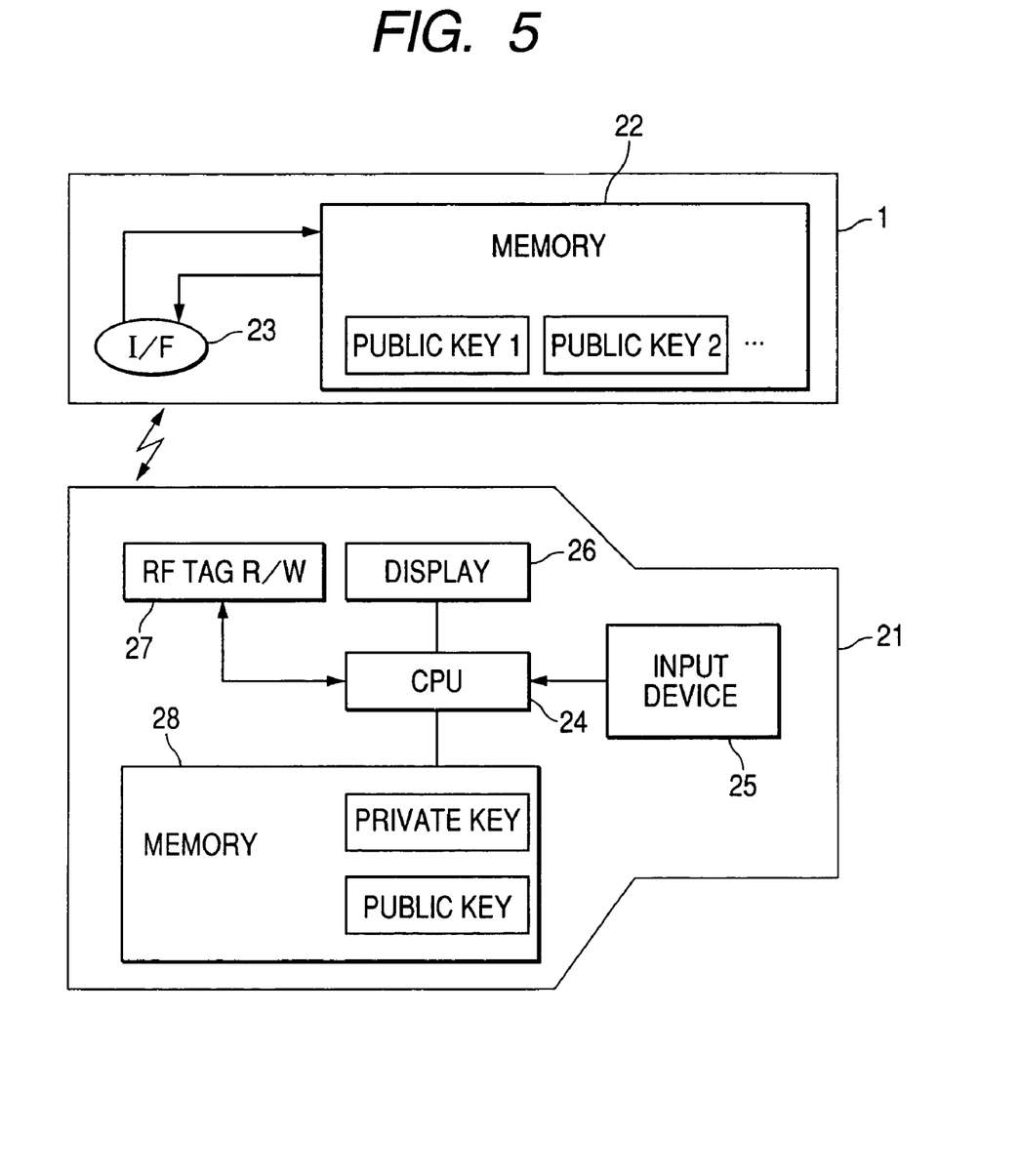
FIG. 5 is a block diagram showing an electrical structure of the RF tag and an electrical structure of an information terminal used for reading and writing the RF tag.

FIG. 5 is a block diagram showing an electrical structure of the RF tag 1, and an electrical structure of an information terminal 21 used for reading and writing the RF tag 1. As shown in this figure, the RF tag 1 includes a nonvolatile memory 22, and an interface part 23. The interface part 23 is for producing, from received radio signals which are transmitted by the information terminal 21, a power supply voltage for use in the RF tag 1, and performing reading and writing operations to the memory 22.

The information terminal 21 includes a CPU 24, an input device 25 such as a keyboard, a display device 26 such as an LCD, a tag reader/writer, and a memory 28. The information terminal 21 has a private key and a public key stored in the memory 28. Information items about the goods to which the RF tag 1 is attached such as a place of production and a date of shipment or manufacture of the goods can be inputted into the information terminal 21 by manipulating the input device 25.

The information terminal 21 encrypts the inputted information items by use of the private key, and writes the encrypted information items into the RF tag 1 together with the public key. This makes it possible to prevent the information items contained in the RF tag 1 from being tampered. To read the information items from the RF tag 1, it is necessary to decrypt the encrypted information items by use of the private key. Since the private key is stored in the RF tag 1, any one picking up a goods to which the RF tag 1 is attached can read the information items about this goods.

Figure 6:
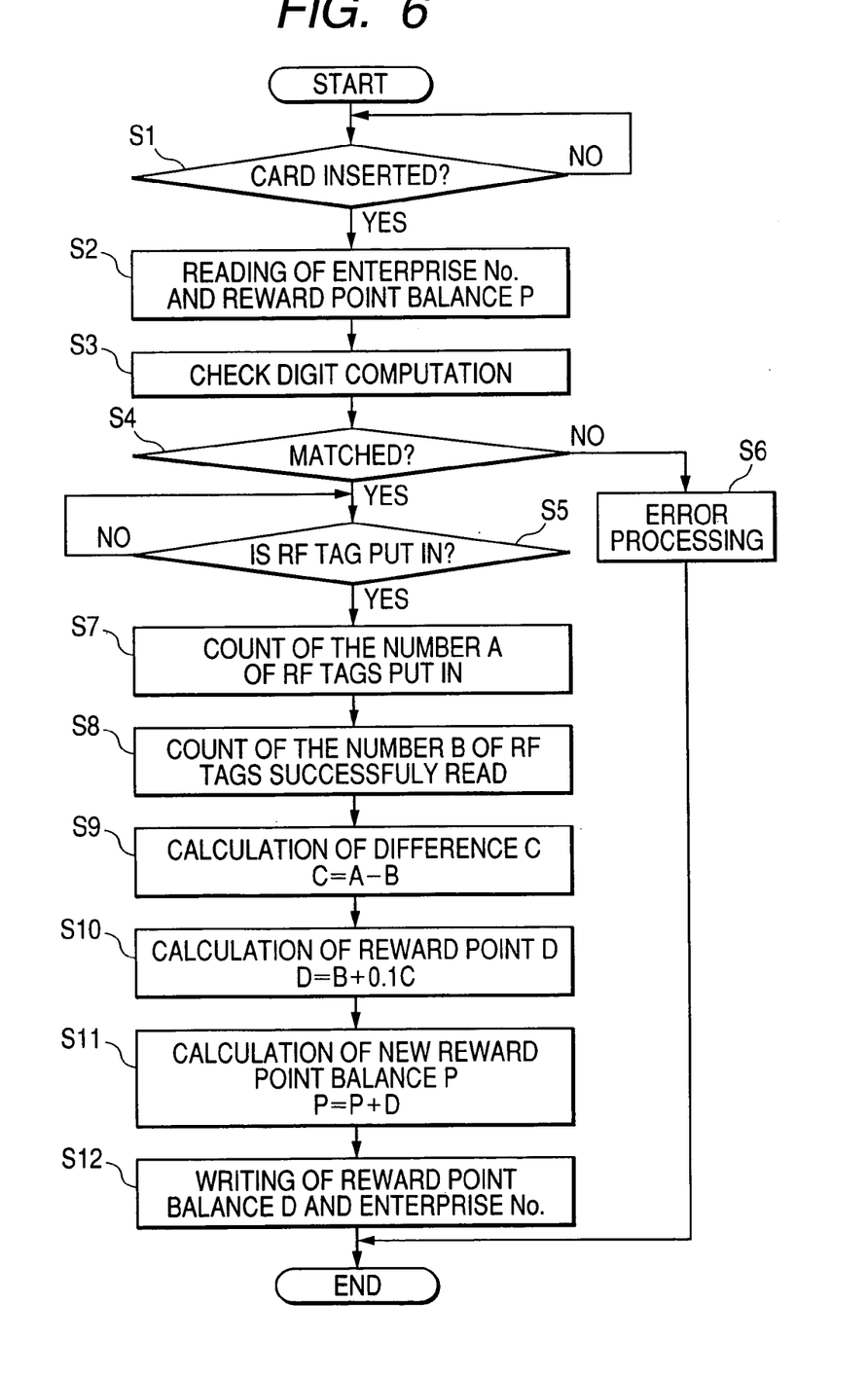
FIG. 6 is a flowchart showing operation of a CPU of the RF tag collecting apparatus when a consumer puts the RF tags to the RF tag collecting apparatus.

FIG. 6 is a flowchart showing the operation of the CPU 14 when a consumer puts the RF tags 1 in the RF tag collecting apparatus 8. The CPU 14 is in a wait state until the membership card 9 is inserted into the card slot 10 of the RF tag collecting apparatus 8. If it is detected at step S1 that the membership card 9 has been inserted, then the CPU 14 reads at step S2 the enterprise number and a reward point balance P from this membership card 9.

Next, the CPU 14 calculates at step S3 check digits of the enterprise number by performing a predetermined computation, and subsequently checks at step S 4 whether the calculated check digits match one of those prestored in the memory 15, or they match none of those prestored in the memory 15. If the check result shows "YES", then the CPU 14 determines that the card 9 is an authentic one issued by the RF tag recycling agency 2, and the process moves to step S5. If the check result shows "NO", then the CPU 14 determines that the card 9 is not an authentic one, and performs at step S6 an error processing, for example, ejecting the card 9 by driving a card ejecting mechanism (not shown) to end the process.

In step S5, the CPU 14 continues to be in the wait state until the consumer puts the RF tags 1 in the RF tag collecting apparatus 8. While the RF tags 1 are thrown into the RF tag collecting apparatus 8 through the mouth 17, the magnetic sensor 16 outputs the detection signal to the CPU 14 each time each of the RF tags 1 moves past the magnetic sensor 16 in order to determine the total number A of the RF tags 1 that have been put in through the mouth 17 and received in the receiver 11 (step S7). Next, the CPU 14 performs at step S8 radio communication with the RF tags 1 in the receiver 11 by use of the tag reader 13, and counts the number B of the RF tags 1 that have been successfully read through this radio communication.

After that, the CPU 14 calculates at step S9 the difference C between the number A and the number B. The RF tags 1 that can be read can be assumed to be nondefective and therefore reusable. Accordingly, if the calculated difference C is not zero, it means that at least one of the RF tags 1 received in the receiver 11 is defective.

At subsequent step S10, the CPU 14 as a calculating unit calculates a reward point D for the RF tags 1 received in the receiver 11. The reward point D can be calculated by the following equation.

$$D=B+0.1C$$

This equation is based on the following ideas.

The number B represents the number of the RF tags 1 which were read successfully and therefore have been confirmed to be nondefective. The number C represents the number of the RF tags 1 which failed to be read and therefore have been determined to be defective. It goes without saying that only the RF tags 1 that have been confirmed to be nondefective can be reused in the RF tag recycling system.

Accordingly, for the purpose of giving incentive to the consumers to handle the RF tags 1 with care to prevent them from becoming defective, the reward point for one defective RF tag 1 is set at one tenth of that for one nondefective RF tag 1. If all of the RF tags 1 in the receiver 11 are nondefective, that is if C is zero, the reward point for them is equal to the reward point for one nondefective RF tag multiplied by the number of the RF tags 1 received in the receiver 11. Incidentally, the RF tags may be used as recyclable resource material even if they are confirmed to be defective.

Figure 7:
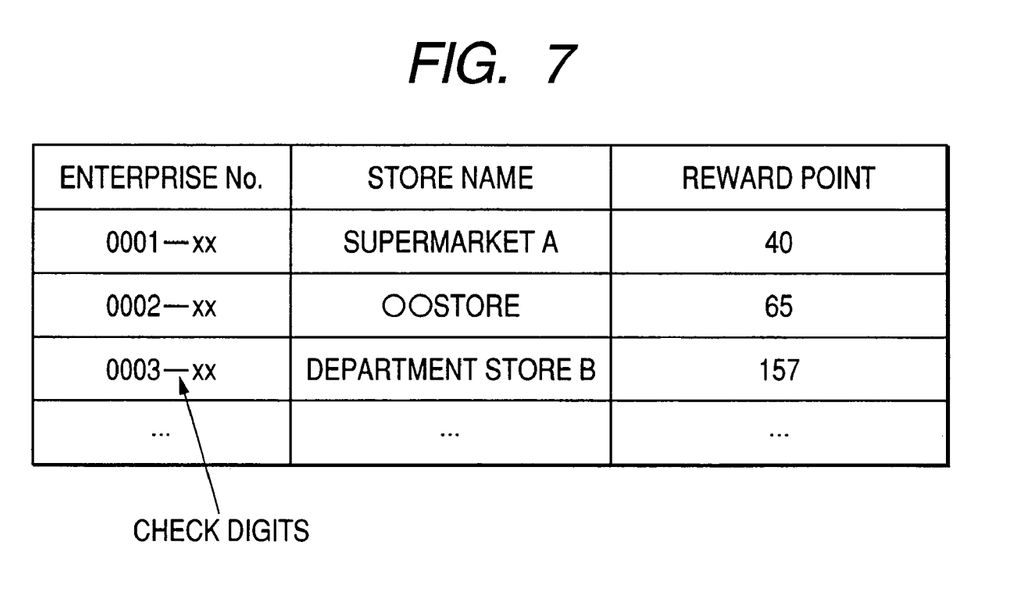
FIG. 7 is a schematic representation of a structure of data stored in a memory of the RF tag collecting apparatus.

At subsequent step S11, the CPU 14 performs the computation of P=P+D. The newly computed P is written as an updated reward point balance P into the membership card 9 through the card reader/writer 12. Finally, at step S12, the reward point D calculated at step S10 is written into the memory 15 together with the enterprise number read from the membership card 9. FIG. 7 is a schematic representation of a structure of data stored in the memory 15. Although not shown in FIG. 6, after step 12, the CPU 14 operates to open a bottom of the receiver 11 to drop the RF tags 1 in the receiver 11 to a collecting container (not shown) and also to eject the membership card 9 by driving a not shown mechanism.

As explained above, each time a consumer brings the RF tags 1 removed from the goods which the consumer bought, and puts them into the RF tag collecting apparatus 8, data including the reward point calculated by the CPU 14 is accumulated into the memory 15. A tag collecting person regularly makes the rounds of the tag collecting spots to gather the RF tags collected in the RF tag collecting apparatus 8 installed at each of the tag collecting spots. The tag collecting person also gathers data from the memory 15 of the RF tag collecting apparatus 8 by connecting a data reading terminal to the RF tag collecting apparatus 8 at each of the tag collecting spots. The gathered RF tags and data are brought to the RF tag recycling agency 2.

Figure 8:
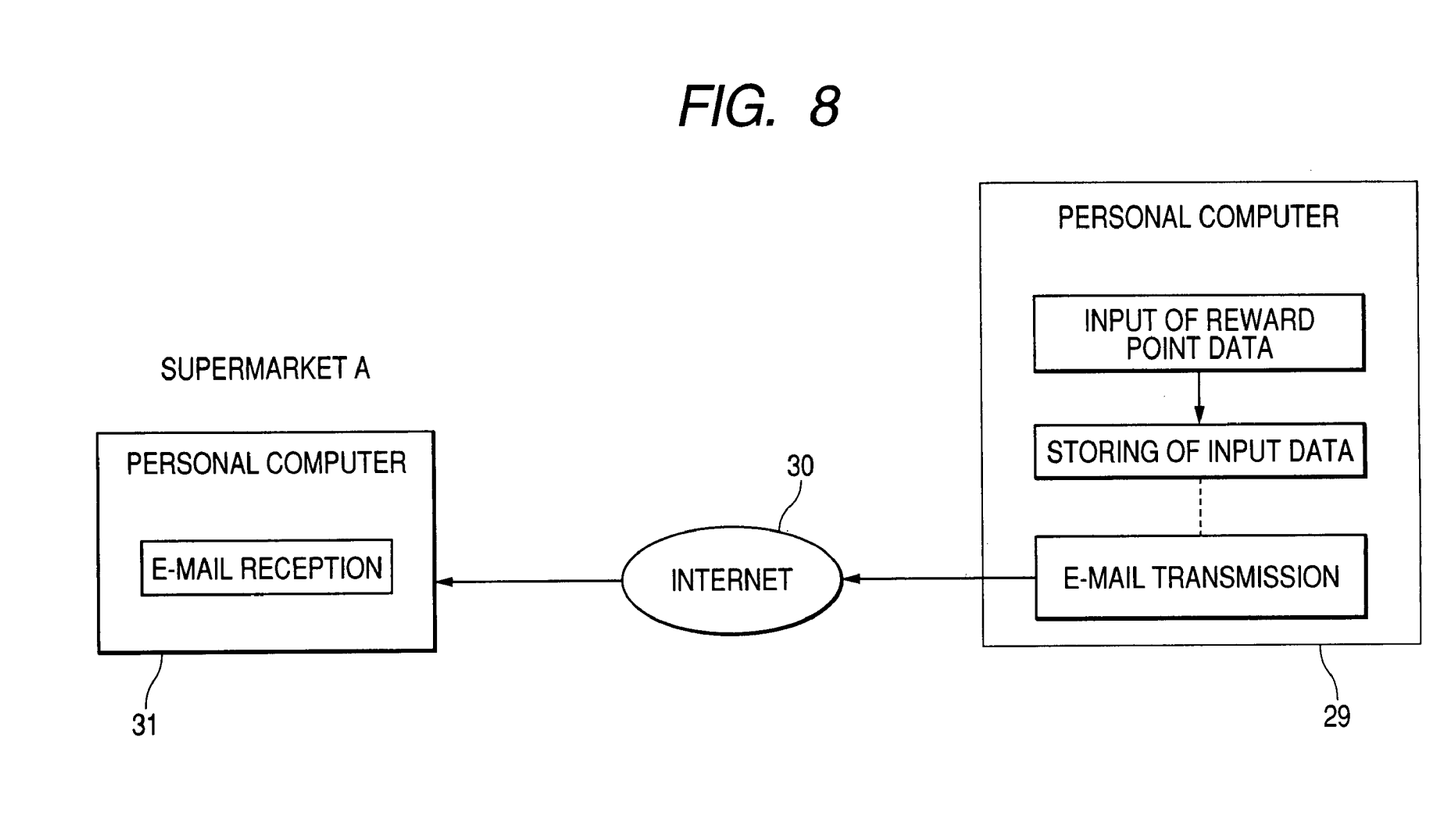
FIG. 8 is a view for explaining data processing operation performed by an RF tag recycling agency.

The gathered data is processed by a personal computer 29 in the RF tag recycling agency 2 (see FIG. 8). The personal computer 29 groups the gathered data by enterprise numbers, and stores them in a storage device such as a hard disk storing a database. Each grouped data is transmitted as an e-mail to a corresponding enterprise via the internet 30 when it has accumulated to a certain amount. For example, if a supermarket A, which is one of the enterprises registered in the database, receives the e-mail from the RF tag recycling agency 2 at its personal computer 31, the received e-mail is stored in a storage device such as a hard disk.

Figure 9:
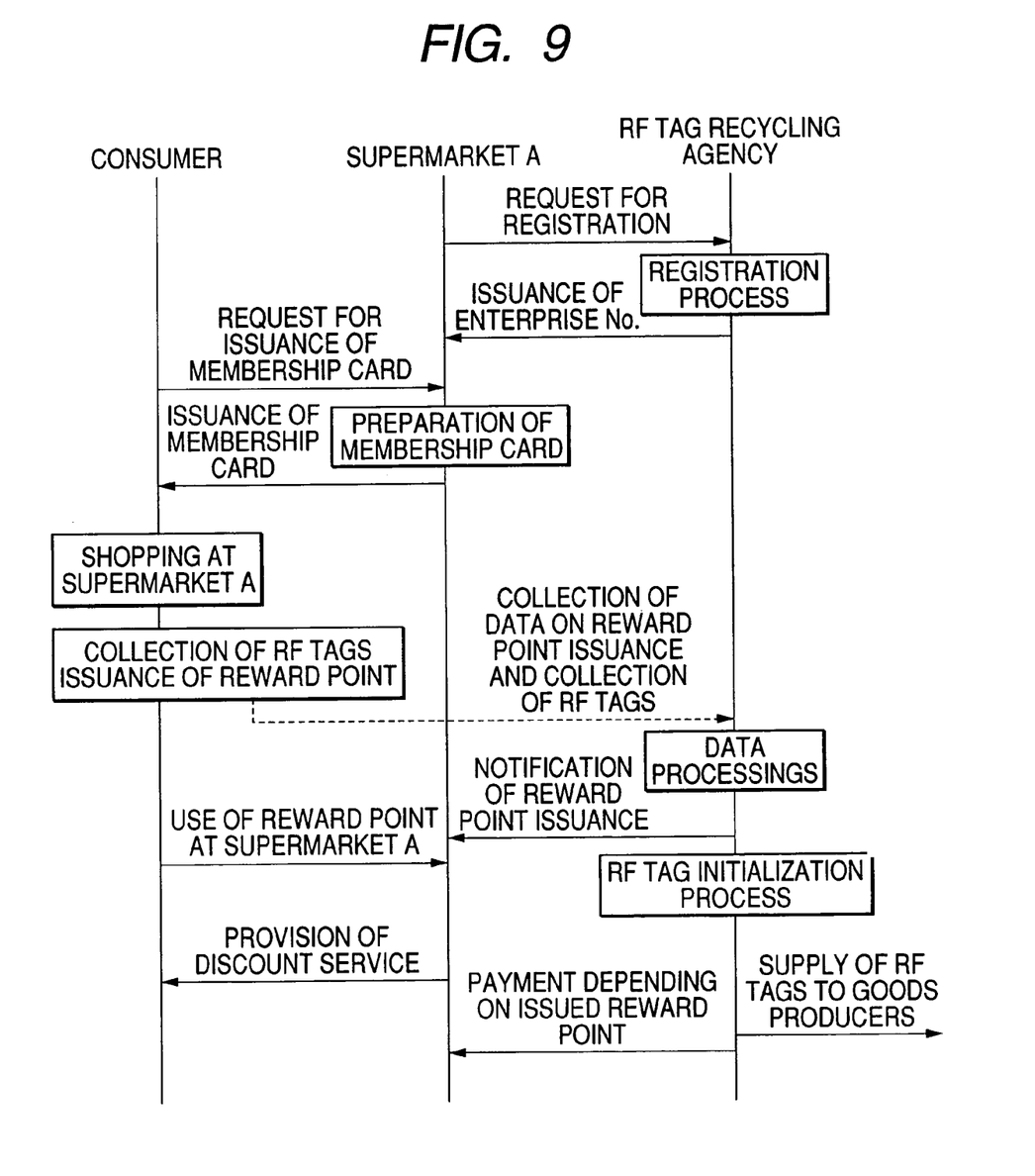
FIG. 9 is a sequence diagram showing a flow of operations between a supermarket and a consumer using the supermarket and between the supermarket and the RF tag recycling agency.

FIG. 9 is a sequence diagram showing a flow of operations performed mainly between the supermarket A and a consumer using the supermarket A and between the supermarket A and the RF tag recycling agency 2. The supermarket A wishing to use the RF tag recycling system to provide its consumers with the RF tag recycling service by attaching the RF tags to the goods which the supermarket A handles, makes an application for registration to the RF tag recycling agency 2. The supermarket A has to bear a set registration fee.

The RF tag recycling agency 2 carries out a registration procedure for the supermarket A, and issues an enterprise number to the supermarket A. After that, the supermarket A issues membership cards storing the enterprise number of the supermarket A to the consumers applying for becoming members of the RF tag recycling service.

Any consumer shopping in the supermarket A can confirm the safety of a goods which the consumer is thinking to buy by reading data on the distribution channel of this goods, for example, from an RF tag attached to this goods by use of a tag reader installed in the supermarket A. This RF tag is also used in performing the checkout process for this goods at a cash register in the supermarket A.

The RF tag is removed from the goods after the consumer comes back home, and the RF tag remains in the consumer's hand.

As a matter of course, the RF tags can be collected at the cash register by removing them from the goods to which they have been attached during the checkout process for them. However, this prolongs the checkout process, and may overcrowd the cash register. Hence, to smoothly run the RF tag recycling system, it is preferable to provide the consumers with some service in return for their cooperating in collecting the RF tags.

When the RF tags are accumulated to a certain extent, the consumer brings them to the RF tag collecting apparatus 8. Through the operations performed by the RF tag collecting apparatus 8 explained above with reference to FIG. 6, the reward point depending on the number of the RF tags put into the RF tag collecting apparatus 8 is written into the membership card 9 of the consumer.

The RF tags accumulated in the RF tag collecting apparatus 8 and the data on the issuances of the reward point are gathered and brought to the RF tag recycling agency 2 by the tag collector person. The RF tag recycling agency 2 performs the data processings on the gathered data as explained above with reference to FIG. 8, and informs the supermarket A of the issuances of the reward point. The gathered RF tags are initialized at the RF tag recycling agency 2, and supplied to goods producers, for example, to be reused.

On the other hand, when the consumer makes, at the cash register in the supermarket A, a request to use the reward point accumulated in the membership card 9, the supermarket A gives a discount to the consumer depending on the reward point balance. Thus, the consumer's burden of the goods price increase brought by the introduction of the RF tag recycling system in the supermarket A can be recovered or reduced. At a later date, the RF tag recycling agency 2 pays money to the supermarket A depending on the reward point issued for the RF tags that have been removed from the goods sold at the supermarket A and collected in the RF tag collecting apparatus 8.

As explained above, in this embodiment, the RF tag collecting apparatus 8 installed in each of the tag collecting spots calculates the reward point value from the number of the RF tags which the consumer has put into the tag collecting apparatus 8, and updates the reward point balance stored in the membership card 9 of the consumer by adding the calculated reward point to the reward point balance. The consumer carrying the membership card 9 issued by the supermarket A can receive the discount service depending on the reward point balance stored in the membership card 9 when the consumer shops at the supermarket A. This gives incentive to the consumers to actively collect the RF tags.

In this embodiment, since the RF tag recycling agency 2 gathers the RF tags together with the data defining where the collected RF tags originate from, each enterprise or store can know the number of the RF tags moved to consumers and the number of the RF tags collected from the consumers on the basis of notification sent from the RF tag collecting agency 2.

In this embodiment, it is possible to determine the sharing of the burden of running the RF tag recycling system among the stores utilizing this system on the basis of their different numbers of the RF tags moved to the consumers and the RF tags collected from the consumers.

Stores that have introduced the RF tag recycling system can differentiate themselves from their competitors that do not introduce the RF tag recycling system, because the stores using the RF tag recycling system can publicize their sophisticated goods management system and ability to give their consumers with the price discount service in return for the consumer's cooperation on collecting the RF tags. This gives enterprises or stores an incentive to introduce the RF tag recycling system.

In this embodiment, since the number of the RF tags put into the RF tag collecting apparatus 8 is checked by radio communication between them and the tag reader in the RF tag collecting apparatus 8, nondefective RF tags can be discriminated from defective RF tags reliably and efficiently.

Furthermore, in this embodiment, the membership cards issued by the same store affiliated with the RF tag recycling system contain the same enterprise number for identifying the issuer, so that the RF tag collecting apparatus 8 can accumulate the calculated reward point in its memory for each enterprise number. Accordingly, many enterprises belonging to different kinds of industries can participate in the same RF tag recycling system.

The present invention should not be construed as being limited to the above described embodiment. For example, the reward point may be given only for nondefective RF tags collected in the RF tag collecting apparatus 8. In this case, it becomes unnecessary to count the number of the RF tags passing the passageway 19 of the RF tag collecting apparatus 8, and accordingly the magnetic marker 20 and the magnetic sensor 16 may be removed. The tag reader 13 reading the RF tags received in the receiver 11 is suffice in this case.

It is also possible to count the RF tags passing the passageway 19 of the RF tag collecting apparatus 8 by use of a mechanical means instead of the magnetic sensor 16.

Provided that the RF tag collecting apparatus 8 collects only the RF tags attached to goods sold at the store in which this RF tag collecting apparatus 8 is installed, the membership card 9 may not contain any enterprise number.

The RF tag collecting apparatus 8 may be configured to regularly transmit the data accumulated in the memory 15 to the RF tag recycling agency 2 over the internet. The notification from the RF tag recycling agency 2 to each store may be made by mail.

The RF tag recycling system may have an agency which operates to perform the initialization of the collected RF tags independently of the tag recycling agency 2.

Each store may give the consumers exchange coupons, goods, or travel vouchers instead of giving them price discount service.

The above explained preferred embodiments are exemplary of the invention of the present application which is described solely by the claims appended below. It should be understood that modifications of the preferred embodiments may be made as would occur to one of skill in the art.

What is claimed is:

1. A system for recycling RF tags containing information items on goods to which said RF tags are attached comprising:
    data storage mediums which are portable by consumers and issued by stores affiliated with said system;
    at least one RF tag collecting apparatus configured to calculate, when one of said data storage mediums is inserted into said RF tag collecting apparatus, a reward point value for RF tags put in said RF tag collecting apparatus, and to update said one of said data storage mediums on the basis of said calculated reward point value; and
    a data processing apparatus configured to accumulate said calculated reward point value received from said RF tag collecting apparatus, and to notify one of said stores which is an issuer of said one of said data storage mediums of information on an accumulated reward point value.

2. The system according to calm 1, wherein said data processing apparatus is configured to notify one of said stores which is an issuer of said one of said data storage mediums of information on an accumulated reward point value.

3. The system according to calm 1, wherein said RF tag collecting apparatus includes a counter for counting the number of said RF tags put in a receiver thereof, a reader/writer updating said data storage medium inserted into said RF tag collecting apparatus by reading a reward point balance from said inserted data storage medium, performing addition of said reward point balance and a reward point value which said RF tag collecting apparatus calculates on the basis of the number of said RF tags counted by said counter, and writing a result of said addition as a new reward point balance into said inserted data storage medium.

4. The system according to claim 3, wherein said RF tag collecting apparatus includes a check device for determining whether said RF tags received in said receiver are defective or not one by one, and is configured to lower said calculated reward point value depending on the number of said RF tags received in said receiver and determined to be defective by said check device.

5. The system according to claim 4, wherein said check device is a tag reader capable of reading said RF tags received in said receiver.

6. The system according to claim 5, wherein each of said data storage mediums prestores one of enterprise IDs assigned to said stores, and said RF tag collecting apparatus is configured to store said calculated reward point value for each of said enterprise IDs.

7. The system according to claim 6, wherein said data processing apparatus includes a storage device forming a database for accumulating said calculated reward point value received from said RF tag collecting apparatus for each of said enterprise IDs.

8. An RF tag collecting apparatus for use in a system for recycling RF tags containing information items on goods to which said RF tags are attached, said RF tag collecting apparatus comprising:

a receiver receiving RF tags put in said RF tag collecting apparatus;

a counter for counting the number of said RF tags received in said receiver;

a calculating unit calculating a reward point value for said RF tags received in said receiver on the basis of said number counted by said counter;

a reader/writer updating a data storage medium inserted into said RF tag collecting apparatus by reading a reward point balance from said inserted data storage medium, performing addition of said reward point balance and said calculated reward point value, and writing a result of said addition as a new reward point balance into said inserted data storage medium.

9. The RF tag collecting apparatus according to claim 8, further comprising a check device for determining whether said RF tags received in said receiver are defective or not one by one, said calculating unit being configured to lower said calculated reward point value depending on the number of said RF tags received in said receiver and determined to be defective by said check device.

10. The RF tag collecting apparatus according to claim 9, wherein said check device is a tag reader capable of reading said RF tags received in said receiver.

* * * * *

UNITED STATES PATENT AND TRADEMARK OFFICE
CERTIFICATE OF CORRECTION

PATENT NO. : 7,312,708 B2
APPLICATION NO. : 11/137568
DATED : May 26, 2005
INVENTOR(S) : Atsushi Tano It is certified that error appears in the above-identified patent and that said Letters Patent is hereby corrected as shown below:

Title page

Should read Item (73), as Assignee:

DENSO WAVE "INCORPORATED", Tokyo (JP)

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,312,708 B2  Page 1 of 1
APPLICATION NO. : 11/137568
DATED : December 25, 2007
INVENTOR(S) : Atsushi Tano It is certified that error appears in the above-identified patent and that said Letters Patent is hereby corrected as shown below:

Title page

Should read Item (73), as Assignee:

DENSO WAVE "INCORPORATED", Tokyo (JP)

This certificate supersedes the Certificate of Correction issued May 13, 2008.

Signed and Sealed this

Third Day of June, 2008

JON W. DUDAS
*Director of the United States Patent and Trademark Office*